United States Patent
Magi et al.

(10) Patent No.: US 10,755,678 B2
(45) Date of Patent: Aug. 25, 2020

(54) REFORMATTING IMAGE DATA USING DEVICE SENSING

(71) Applicant: Intel Corporation, Santa Clara, CA (US)

(72) Inventors: Aleksander Magi, Portland, OR (US); Glen J. Anderson, Beaverton, OR (US); Gustavo Fricke, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/189,940

(22) Filed: Nov. 13, 2018

(65) Prior Publication Data

US 2019/0103075 A1 Apr. 4, 2019

(51) Int. Cl.
*G06F 3/14* (2006.01)
*G09G 5/391* (2006.01)
*G06F 3/147* (2006.01)

(52) U.S. Cl.
CPC .......... *G09G 5/391* (2013.01); *G06F 3/1446* (2013.01); *G06F 3/147* (2013.01); *G09G 2300/026* (2013.01); *G09G 2340/0407* (2013.01); *G09G 2340/0492* (2013.01); *G09G 2354/00* (2013.01); *G09G 2356/00* (2013.01); *G09G 2360/02* (2013.01); *G09G 2360/04* (2013.01)

(58) Field of Classification Search
None
See application file for complete search history.

(56) References Cited

U.S. PATENT DOCUMENTS 8,363,170 B2 * 1/2013 Kostepen ............ B60R 11/0235
345/1.1
2006/0170958 A1 * 8/2006 Jung ................... H04N 1/00005
358/1.15

(Continued)

OTHER PUBLICATIONS

Marquardt, et al.; "The Proximity Toolkit: Prototyping Proxemic Interactions in Ubiquitous Computing Ecologies" Department of Computer Science University of Calgary, Canada; SMART Technologies Canada; Oct. 16-19, 2011.

(Continued)

*Primary Examiner* — Andrew G Yang
(74) *Attorney, Agent, or Firm* — Fletcher Yoder, P.C.

(57) ABSTRACT

The presently disclosed display device includes one or more user detection sensors that determine a user location in respond to the display device. The display device then reformats image data based on the determined user location, such as by transitioning the image data from one mode to another and/or angling the image data toward the determined user location. When sharing the image data with another display device, the display devices may reformat the image data based on user location without a user manually entering a desired format or orientation. In addition, the display devices may determine whether they are touching or almost touching and, in response, split, reformat, or re-orient the image data to combine to form a single, larger display. By reformatting or orienting image data toward users using device sensors, instead of relying on user customization, the presently disclosed techniques provide more efficient and intuitive user experiences.

20 Claims, 9 Drawing Sheets

(56) References Cited

U.S. PATENT DOCUMENTS

| | | | | |
|---|---|---|---|---|
| 2011/0298829 | A1* | 12/2011 | Stafford | G06K 9/00248 345/659 |
| 2012/0206319 | A1* | 8/2012 | Lucero | H04N 21/4788 345/1.3 |
| 2012/0242596 | A1* | 9/2012 | Sip | G06F 3/04883 345/173 |
| 2014/0049447 | A1* | 2/2014 | Choi | G06F 3/1454 345/1.2 |
| 2014/0152682 | A1* | 6/2014 | Yoon | G06F 3/1438 345/545 |
| 2014/0218266 | A1* | 8/2014 | Chen | G06F 3/1446 345/1.3 |
| 2014/0320395 | A1* | 10/2014 | Chi | G06F 3/013 345/156 |
| 2014/0368456 | A1* | 12/2014 | Sakai | G06F 3/041 345/173 |
| 2015/0116362 | A1* | 4/2015 | Aurongzeb | H04N 7/15 345/650 |
| 2015/0278998 | A1* | 10/2015 | Jothiswaran | G06T 3/60 345/650 |
| 2015/0347397 | A1* | 12/2015 | Venkatapathy | G06F 17/2818 704/2 |
| 2017/0366937 | A1* | 12/2017 | Lee | G06T 11/206 |

OTHER PUBLICATIONS

Vari, et al.; "mmWaves RSSI Indoor Network Localization" Department of Enterprise Engineering, University of Rome, Italy; Department of Information Engineering, Computer Science and Mathematics, University of L'Aquila, Italy; 2014.

Sanchis, et al.; "A Novel Simultaneous Tracking and Direction of Arrival Estimation Algorithm for Beam-Switched Base Station Antennas in Millimeter-Wave Wireless Broadband Access Networks" Fibre-Radio Group Instituto ITACA, ETSI Telecomunicacion Universidad Politecnica de Valencia, Spain; 2002.

Shahmansoori, et al.; "Position and Orientation Estimation through Millimeter Wave MIMO in 5G Systems" IEEE Transactions on Wireless Communications; Feb. 6, 2017.

Deng, et al.; "Mm-Wave MIMO Channel Modeling and User Localization Using Sparse Beamspace Signatures" Electrical and Computer Engineering, University of Wisconsin-Madison; 2014 IEEE 15th International Workshop on Signal Processing Advances in Wireless Communications (SPAWC).

Qualcomm; "Mobilizing mmWave with 5G" https://www.qualcomm.com/videos/mobilizing-mmwave-5g; Video length 3:28; May 14, 2018.

* cited by examiner

REFORMATTING IMAGE DATA USING DEVICE SENSING

BACKGROUND

This disclosure relates generally to reformatting image data and, more particularly, to determining a user location in reference to a display device using sensors of the display device and reformatting the image data based on the determined user location.

This section is intended to introduce the reader to various aspects of art that may be related to aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

A display device may reformat or orient image data when a user moves or changes a position of the display device. For example, if the user rotates a display device, such as a smartphone, from a vertical position to a horizontal position, the smartphone may determine that it has been rotated via orientation technology, such as a gyroscope, an accelerometer, and/or a magnetometer, and reformat or orient the image data from a portrait mode to a landscape mode. However, the display device may not reformat the image data if the display device remains stationary while the user moves around the display device without physically interacting with the device to engage the orientation technology.

Additionally, to share the image data with another display device or display the image data on both a first display device and a second display device, users may manually communicatively couple their devices to each other, such as by using WiFi-based screen sharing. In some cases, a user can manually enter a desired orientation (e.g., portrait mode or landscape mode) on a display device. Moreover, the display devices may not automatically split, reformat, or re-orient the image data to combine to form a single, larger display when they are touching or almost touching.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure includes apparatuses and methods for reformatting image data using device sensing. A display device may include a variety of user detection sensors that may be used to determine a user location (e.g., in reference to the display device), such as image-based sensors (e.g., cameras), proximity sensors, radio sensors (e.g., radar or WiFi sensors), ultrasound sensors, thermal sensors, audio sensors (e.g., microphones), or wearable or other device tracking sensors. The display device may then reformat image data based on the determined user location, such as by transitioning the image data from one mode (e.g., portrait mode or landscape mode) to another and/or angling the image data toward the determined user location.

Moreover, when sharing the image data with another display device, the display devices may automatically reformat the image data based on user location (e.g., of either or both users) without a user manually entering a desired format or orientation (e.g., portrait mode or landscape mode) on a display device. In addition, the display devices may automatically determine whether they are touching or almost touching and, in response, split, reformat, or re-orient the image data to combine to form a single, larger display. Similarly, the display devices may automatically determine that they are no longer touching or almost touching and, in response, each reformat or re-orient the image data (instead of splitting the image data), and display the reformatted image data. By automatically reformatting orienting image data toward one or more users using device sensors, instead of relying on manual display customization from the users, the presently disclosed techniques provide more efficient and intuitive user experiences.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It may be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it may be appreciated that such a development effort might be complex and time consuming, but would nevertheless be a routine undertaking of design, fabrication, and manufacture for those of ordinary skill having the benefit of this disclosure.

Techniques are disclosed herein for determining a user location in reference to a display device using sensors of the display device and reformatting image data based on the determined user location. In particular, the presently disclosed display device may include a variety of user detection sensors that determine a user location. The user detection sensors may include image-based sensors (e.g., cameras), radio sensors (e.g., radar sensors), ultrasound sensors, thermal mapping sensors, audio sensors (e.g., microphones), or wearable or other device tracking sensors. The display device may then reformat image data based on the determined user location, such as by transitioning the image data from one mode (e.g., portrait mode or landscape mode) to another and/or angling the image data toward the determined user location.

Moreover, when sharing the image data with another display device, the display devices may automatically reformat the image data based on user location (e.g., of either or both users) without a user manually entering a desired format or orientation (e.g., portrait mode or landscape mode) on a display device. In addition, the display devices may automatically determine whether they are touching or almost touching and, in response, split, reformat, or re-orient the image data to combine to form a single, larger display. Similarly, the display devices may automatically determine that they are no longer touching or almost touching and, in response, each reformat or re-orient the image data (instead of splitting the image data), and display the reformatted image data. By automatically reformatting or orienting image data toward one or more users using device sensors, instead of relying on manual display customization from the users, the presently disclosed techniques provide more efficient and intuitive user experiences.

Figure 1:
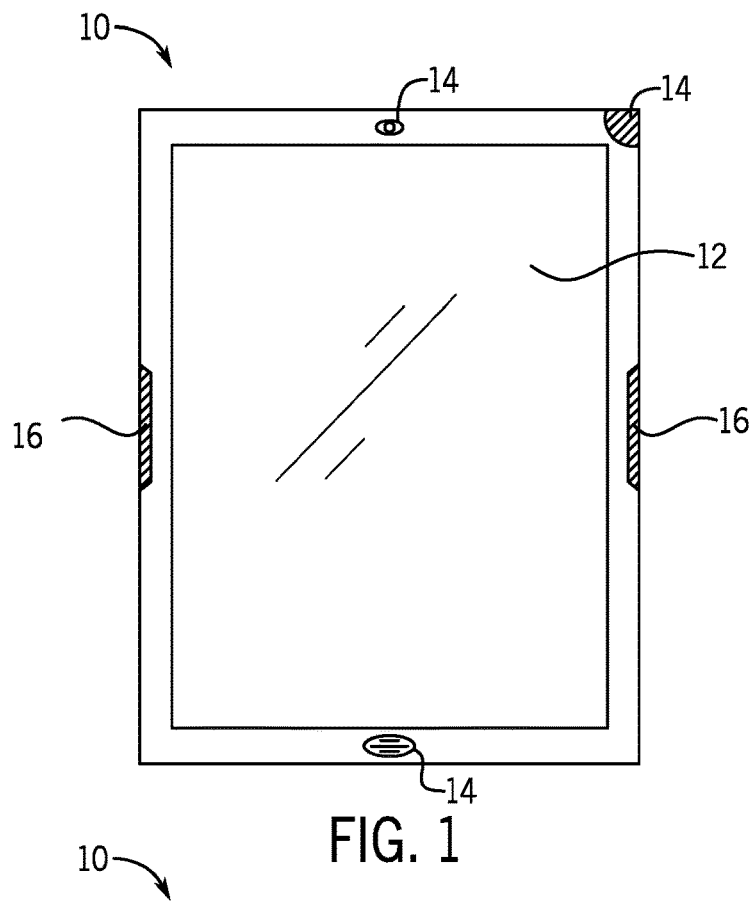
FIG. 1 is a perspective diagram of an electronic display device, according to embodiments of the present disclosure.

With this in mind, FIG. 1 is a perspective diagram of an electronic display device 10, according to embodiments of the present disclosure. The display device 10 may include any suitable electronic device with a display 12. For example, the display device 10 may be a cellular phone, a smartphone, a tablet, a wearable device, a computing device, a desktop computer, or a laptop. The display 12 may employ any suitable technology to present visual information according to electrical input signals by emitting light or modulating available light. For example, the display 12 may be a liquid crystal display (LCD), a plasma display, a light emitting diode (LED) display, an organic LED (OLED) display, a microLED display, or an electromagnetic metasurface.

As illustrated, the display device 10 also includes one or more user detection sensors 14 that may determine a user location (e.g., in reference to the display device 10). For example, the user detection sensors 14 may include an image-based sensor (e.g., a camera) that may detect a user or a portion of the user's body based on image recognition techniques, or detect movement or motion of the user. Similarly, the user detection sensors 14 may include an audio sensor (e.g., a microphone) that may detect sound produced by the user (e.g., movement, footfalls, breathing, and/or voice). As another example, the user detection sensors 14 may include a proximity sensor that may emit an electromagnetic field or beam of electromagnetic radiation (e.g., infrared) and recognize changes in the field or return signal based on interaction with the user. Similarly, the user detection sensors 14 may include a radio sensor (e.g., a radar or WiFi sensor) and/or an ultrasound sensor that may emit a radio or ultrasound wave and recognize changes in the return signal based on interaction with the user. In one embodiment, the user detection sensors 14 may include a thermal sensor that may detect body heat of the user. The user detection sensors 14 may include a wearable or other device tracking sensor that tracks a wearable or other device wirelessly coupled (e.g., by Bluetooth or WiFi) to the display device 10. Assuming the wearable or other device is worn or otherwise attached to the user, the wearable or other device tracking sensor may determine the user location based on tracking the wearable or other device. It should be understood that the user detection sensors 14 may include any suitable sensor or combination of suitable sensors that may determine a user location, and that the sensors listed above are examples.

The display device 10 may also include one or more device detection sensors 16 that may be used to determine a device location and/or a device orientation. For example, a device detection sensor 16 may be used to determine whether another display device is within a certain (e.g., threshold) proximity to the display device 10. The device detection sensors 16 may use any suitable device detection technique, including device tracking, initial gross identification (e.g., where a device detection sensor 16 may detect all devices in a room), or higher precision tracking (e.g., where the device detection sensor 16 may detect device orientation of other display devices, detect adjacent devices, or detect devices that are touching or near touching). In some embodiments, the device detection sensors 16 may include wearable or mobile device pairing sensors that may detect the other display device (such as a wrist-worn wearable device or a smartphone) and/or determine a distance to the other display device. For example, the device detection sensors 16 may include a Bluetooth sensor that determines a Bluetooth received signal strength indication (RSSI) of other display devices. The Bluetooth RSSI may be used to detect devices within a Bluetooth signal range of the Bluetooth sensor and provide an approximate indication of distance of the detected devices. In one embodiment, the device detection sensors 16 may include a 5G New Radio (NR) millimeter wave (mmWave) sensor that may detect directionality of other display devices within a 5G NR mmWave range of the 5G NR mmWave sensor.

The device detection sensors 16 may include one or more sensors that determine a proximity to another display device (e.g., that is adjacent or near-adjacent to the display device 10), which edge of the other display device is in closest proximity to the display device 10, and/or which edge of the other display device is in closest proximity to which edge of the display device 10. In some embodiments, the device detection sensors 16 may be perimeter-based, and be disposed along an edge (e.g., a right edge, a left edge, a top edge, or a bottom edge) or a surface (e.g., a display-side or front-side surface or a back-side surface) of the display device 10. For example, the device detection sensors 16 may include a magnetic sensor, such as a Reed sensor, a Hall sensor, or a micro electro-mechanical system (MEMS) sensor, which measures a capacitance and/or a pressure of the other display device to determine the proximity to the other display device. In some cases, the other display device may include vibration emitters that may cause vibrations to be measured by the MEMS sensor of the display device 10, providing an indication that the devices are adjacent or near adjacent. As another example, the device detection sensors 16 may include a camera or lower resolution light sensor (e.g., equipped with an ultra wide-angle lens (e.g., a fisheye lens) or 180 degree lens) that may detect adjacent or near-adjacent display devices. In one embodiment, the device detection sensors 16 may include a camera (e.g., a panamorphic camera) that enables image capture of the adjacent or near-adjacent display device. The identity and/or orientation of the adjacent or near-adjacent display device may then be determined using image recognition techniques.

Moreover, in some cases, a device detection sensor 16 may detect another display device within a certain (e.g., threshold) proximity of the device detection sensor 16, and the display device 10 may request that the detected device send its orientation back to the display device 10. The detected device may determine its own orientation using orientation technology, which may include an accelerometer (e.g., a six-axis accelerometer), a gyroscope, and/or a magnetometer.

While the user detection sensors 14 and the device detection sensors 16 are illustrated separately in FIG. 1, it should be understood that, in some cases, they may refer to the same sensors. For example, a camera of the display device 10 may act as both a user detection sensor 14 and the device detection sensor 16.

Figure 2:
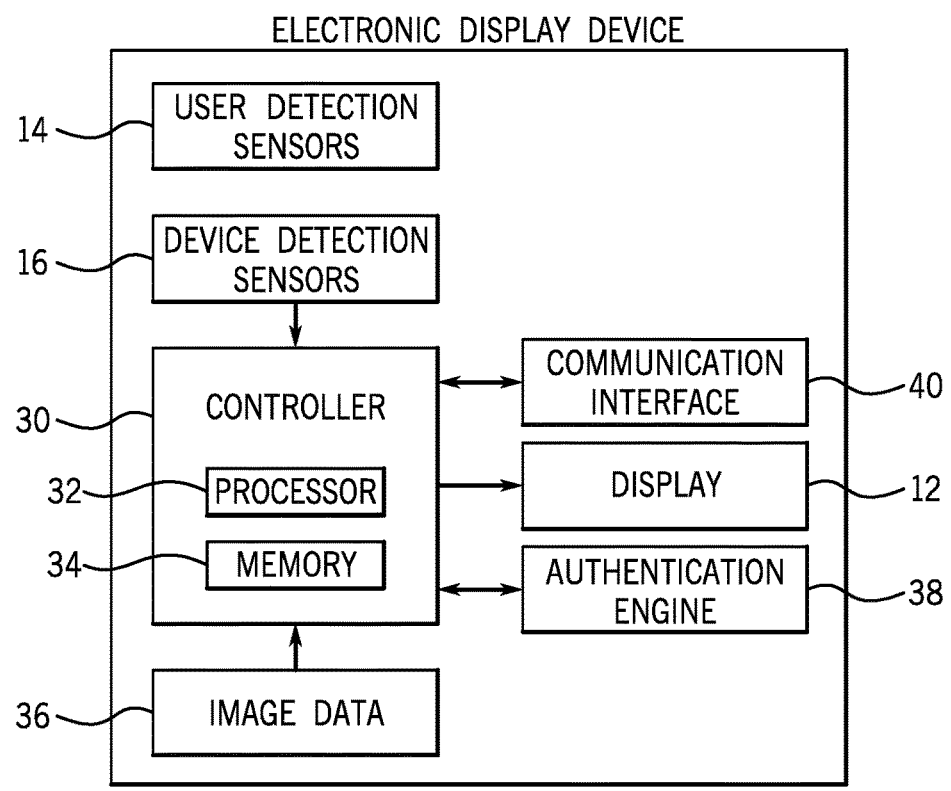
FIG. 2 is a block diagram of the electronic display device of FIG. 1, according to embodiments of the present disclosure.

FIG. 2 is a block diagram of the electronic display device 10 of FIG. 1, according to embodiments of the present disclosure. As illustrated, the display device 10 includes the display 12, the user detection sensors 14, and the device detection sensors 16. The display device 10 may also include a controller 30 that facilitates determining a user location in reference to the display device 10 using user detection sensors 14 of the display device 10 and reformatting or orienting image data based on the determined user location. The controller 30 may include one or more processors 32 (e.g., processing circuitry) and one or more memory devices 34 (which may include one or more storage devices). The processor 32 may execute software programs and/or instructions to determine a user location using user detection sensors 14 of the display device 10 and reformat or orient image data based on the determined user location. Moreover, the processor 32 may include multiple microprocessors, one or more "general-purpose" microprocessors, one or more special-purpose microprocessors, one or more application specific integrated circuits (ASICS), and/or one or more reduced instruction set (RISC) processors. The memory device 34 may store machine-readable and/or processor-executable instructions (e.g., firmware or software) for the processor 32 to execute, such as instructions relating to determining a user location using user detection sensors 14 of the display device 10 and reformatting image data based on the determined user location. As such, the memory device 34 may store, for example, control software, look up tables, configuration data, and so forth, to facilitate determining a user location using user detection sensors 14 of the display device 10 and reformatting image data based on the determined user location. In one embodiment, the processor 32 and the memory device 34 may be external to the controller 30. The memory device 34 may include a tangible, non-transitory, machine-readable-medium, such as a volatile memory (e.g., a random access memory (RAM)) and/or a nonvolatile memory (e.g., a read-only memory (ROM), flash memory, hard drive, and/or any other suitable optical, magnetic, or solid-state storage medium).

In some embodiments, the processor 32 may receive input image data 36, which may include any suitable data or information to be displayed on the display 12. The processor 32 may also determine a user location using the user detection sensors 14, and then reformat the image data 36 based on the determined user location.

The display device 10 may include an authentication engine 38 that authenticates another display device attempting to communicatively couple to the display device 10. In particular, the authentication engine 38 may determine that the other display device is a trusted device (e.g., is listed on a whitelist stored on the display device 10). If the other display is not a trusted device, then the authentication engine 38 may perform a process of determining (e.g., via the user) whether the other display device should be a trusted device. The authentication engine 38 may be implemented in hardware (e.g., circuitry), software (e.g., instructions for execution by a processor), or a combination of the two.

The display device 10 may also include a communication interface 40 that enables the display device 10 to communicate with any suitable communication network. For example, the communication interface 40 may enable the controller 30 to communicate with wireless networks (e.g., a mobile network, a WiFi network, local area network (LAN), wide area network (WAN), or the Internet). In this manner, the communication interface 40 may enable the controller 30 to communicate with, for example, another display device via a communication network.

Figure 3:
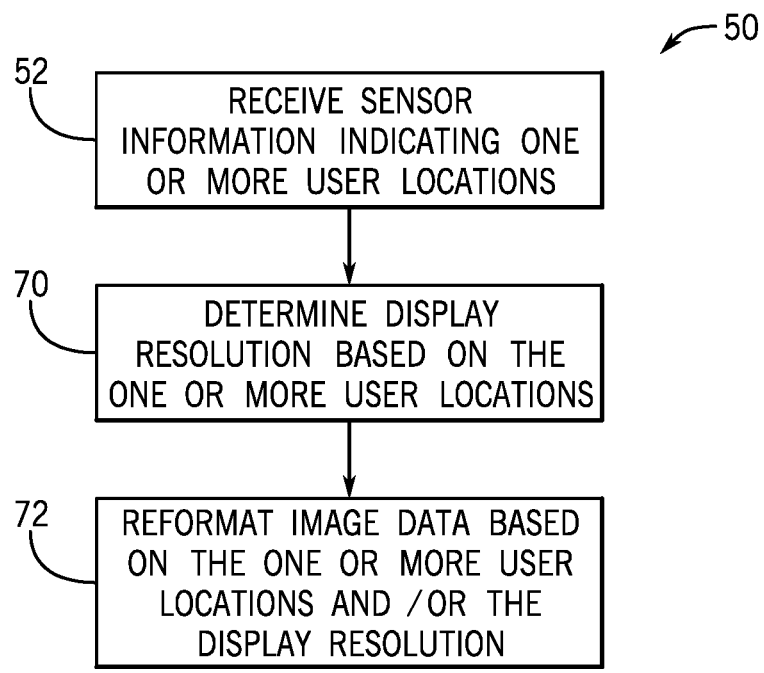
FIG. 3 is a flowchart illustrating a process for determining a user location in reference to the electronic display device of FIG. 1 using one or more user detection sensors of the electronic display device and reformatting or orienting image data based on the determined user location, according to embodiments of the present disclosure.

FIG. 3 is a flowchart illustrating a process 50 for determining a user location in reference to the display device 10 using one or more user detection sensors 14 of the display device 10 and reformatting image data based on the determined user location, according to embodiments of the present disclosure. While the process 50 is described as being performed by the processor 32, it should be understood that the process 50 may be performed by any suitable device that may control components of the display device 10 of FIG. 2. Furthermore, while the process 50 is described using steps in a specific sequence, it should be understood that the present disclosure contemplates that the described steps may be performed in different sequences than the sequence illustrated, and certain described steps may be skipped or not performed altogether. In some embodiments, the process 50 may be implemented by executing instructions stored in a tangible, non-transitory, computer-readable medium, such as the memory device 34, using any suitable processing circuitry, such as the processor 32.

As illustrated, in process block 52, the processor 32 receives sensor information indicating one or more user locations in reference to the display device 10. In particular, the one or more user detection sensors 14 may determine a user location based on sensing or detecting indications of a user. In some embodiments, the user detection sensor 14 may include an image-based sensor (e.g., a camera) that detects a user or a portion of the user's body based on image recognition techniques, or detects movement or motion of the user. For example, the camera may detect a user's face (e.g., looking down on the display device 10) and use facial recognition techniques to determine the user location. The user detection sensor 14 may include an audio sensor (e.g., a microphone) that detects sound produced by the user (e.g., movement, footfalls, breathing, and/or voice). The user detection sensor 14 may include a proximity sensor that may emit an electromagnetic field or beam of electromagnetic radiation (e.g., infrared) and recognize changes in the field or return signal based on interaction with the user. The user detection sensor 14 may include a radio sensor (e.g., a radar or WiFi sensor) and/or an ultrasound sensor that may emit a radio or ultrasound wave and recognize changes in the return signal based on interaction with the user. The user detection sensor 14 may include a thermal sensor that may detect body heat of the user. The user detection sensor 14 may include a wearable or other device tracking sensor that tracks a wearable or other device wirelessly coupled (e.g., by Bluetooth or WiFi) to the display device 10. Assuming the wearable or other device is worn or otherwise attached to the user, the wearable or other device tracking sensor may determine the user location based on tracking the wearable or other device. It should be understood that the user detection sensors 14 may include any suitable sensor or combination of suitable sensors that may determine a user location, and that the sensors listed above are examples.

The one or more user detection sensors 14 may then send an indication of the user location to the processor 32. In some embodiments, the user detection sensors 14 may determine multiple user locations (e.g., corresponding to multiple users). In such a case, the processor 32 may select one of the multiple user locations based on any suitable criteria. For example, the processor 32 may select the nearest user location (and thus the nearest user to the display device 10). This may be because the user located nearest to the display device 10 is more likely than not the user viewing the display 12 of the display device 10. As another example, if the user detection sensor 14 includes a wearable or other device tracking sensor, then the processor 32 may select the user location corresponding to a user wearing the wearable or other device.

Figure 4:
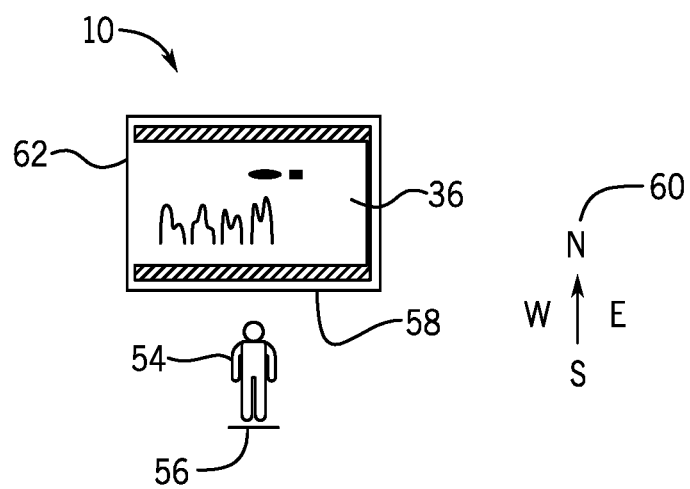
FIG. 4 is a perspective diagram of a user located near the electronic display device of FIG. 1, according to embodiments of the present disclosure.

As an illustrated example, FIG. 4 is a perspective diagram of a user 54 located near the display device 10 of FIG. 1, according to embodiments of the present disclosure. The processor 32 may determine, using the one or more user detection sensors 14, the user location 56 of the user 54. In particular, the processor 32 may determine the user location 56 is nearest to a long edge 58 of the display device 10. For example, referring to the illustrated compass 60 in FIG. 4, the user location 56 may be closest to a southern edge 58 of the display device 10, and as such, the processor 32 may determine the user location 56 is nearest to the southern edge 58.

Referring back to FIG. 3, in process block 70, the processor 32 determines a display format or resolution of the display device 10 based on the one or more user locations. In particular, the processor 32 may determine the format or resolution of the display 12 of the display device 10 based on displaying or orienting image data toward the one or more user locations. For example, in FIG. 4, because the user location 56 is nearest to the long edge 58 (e.g., illustrated as the southern edge 58) of the display device 10, the processor 32 may determine that the display format of the display device 10 is landscape orientation and toward the user 54 (as opposed to in portrait orientation or upside down). If the user location were instead nearest to the short edge 62 (e.g., illustrated as the western edge 62) of the display device 10, then the processor 32 may determine the display format of the display device 10 is portrait orientation toward the user 54 (as opposed to in landscape orientation or upside down).

Moreover, the processor 32 may determine a display resolution of the display device 10 based on the one or more user locations. For example, in FIG. 4, the illustrated display device 10 may have a display resolution (e.g., a native resolution) of 1920×1080 pixels when displaying or orienting image data toward the user location 56 nearest to the long edge 58 (e.g., illustrated as the southern edge 58) of the display device 10. However, if the user location was nearest to a short edge 62 (e.g., illustrated as the western edge 62) of the display device 10, then the display resolution would be 1080×1920 pixels. As such, the processor 32 may determine the display resolution of the display device 10 illustrated in FIG. 4 as 1920×1080 pixels or 1080×1920 pixels depending on the user location 56.

Referring back to FIG. 3, in process block 72, the processor 32 reformats or orients image data based on the determined one or more user locations and/or the display resolution. The processor 32 may then cause or instruct the display 12 of the display device 10 to display the reformatted image data. In particular, the processor 32 may receive the input image data 36. The processor 32 may then cause or instruct the display 12 to display the reformatted image data (e.g., 36) based on the user location determined in process block 52. As illustrated in FIG. 4, the processor 32 may determine that the user location 56 is nearest to a long edge 58 of the display device 10. The processor 32 may then reformat or orient image data 36 so that it is viewed right side up or as intended from the user location 56. In particular, the processor 32 may reformat the image data 36 to be displayed in landscape orientation toward the user 54 (as opposed to in portrait orientation or upside down). If the user location 56 is nearest to the short edge 62 (e.g., illustrated as the western edge 62) of the display device 10, then the processor 32 may reformat the image data 36 to be displayed in portrait orientation toward the user 54 (as opposed to in landscape orientation or upside down).

In some embodiments, the processor 32 may reformat the image data 36 such that the image data 36 is angled toward the user location 56 (e.g., at an angle not perpendicular to the display device 10). That is, if the user location is at a southwest corner 64 of the display device 10, the processor 32 may reformat the image data 36 such that the image data 36 is oriented approximately 45 degrees toward user location and the southwest corner 64 of the display device 10. In this manner, the process 50 may determine the user location 56 using the user detection sensors 14 of the display device 10 and reformat the image data 36 based on the determined user location 56. By automatically reformatting the image data 36 toward the user 54 using the user detection sensors 14, instead of relying on manual display customization from the user 54, the presently disclosed techniques provide more efficient and intuitive user experiences.

The processor 32 may also reformat the image data 36 by converting or resizing the image data 36 from an original or initial resolution to the resolution of the display device 10. For example, if the display device 10 has a resolution greater than that of the image data 36, the processor 32 may scale up the image data 36 to match the resolution of the display device 10. If the display device 10 has a resolution less than that of the image data 36, the processor 32 may scale down the image data 36 to match the resolution of the display device 10.

Moreover, in some embodiments, the processor 32 may determine the type of image data 36 (e.g., as part of a video or movie file, an image file, a text file, a presentation file, or a slideshow file). The processor 32 may then convert the image data 36 from an original or initial format of the type of image data 36 to a more appropriate format based on the display format or resolution of the display device 10. For example, if the type of image data 36 is a video file, and the processor 32 determines that the display device 10 is in landscape orientation (as illustrated in FIG. 4), then the processor 32 may convert the image data 36 to a widescreen format. If the processor 32 determines that the display device 10 is in portrait orientation, then the processor 32 may convert the image data 36 to a standard or fullscreen format. Additionally or alternatively, the processor 32 may apply video processing to the video file to scale up or scale down the video file based on the display resolution of the display device 10. That is, if the display device 10 has a resolution greater than that of the video file, the processor 32 may apply video processing to scale up the image data 36 to match the resolution of the display device 10. If the display device 10 has a resolution less than that of the image data 36, the processor 32 may apply video processing to scale down the image data 36 to match the resolution of the display device 10.

Figure 5:
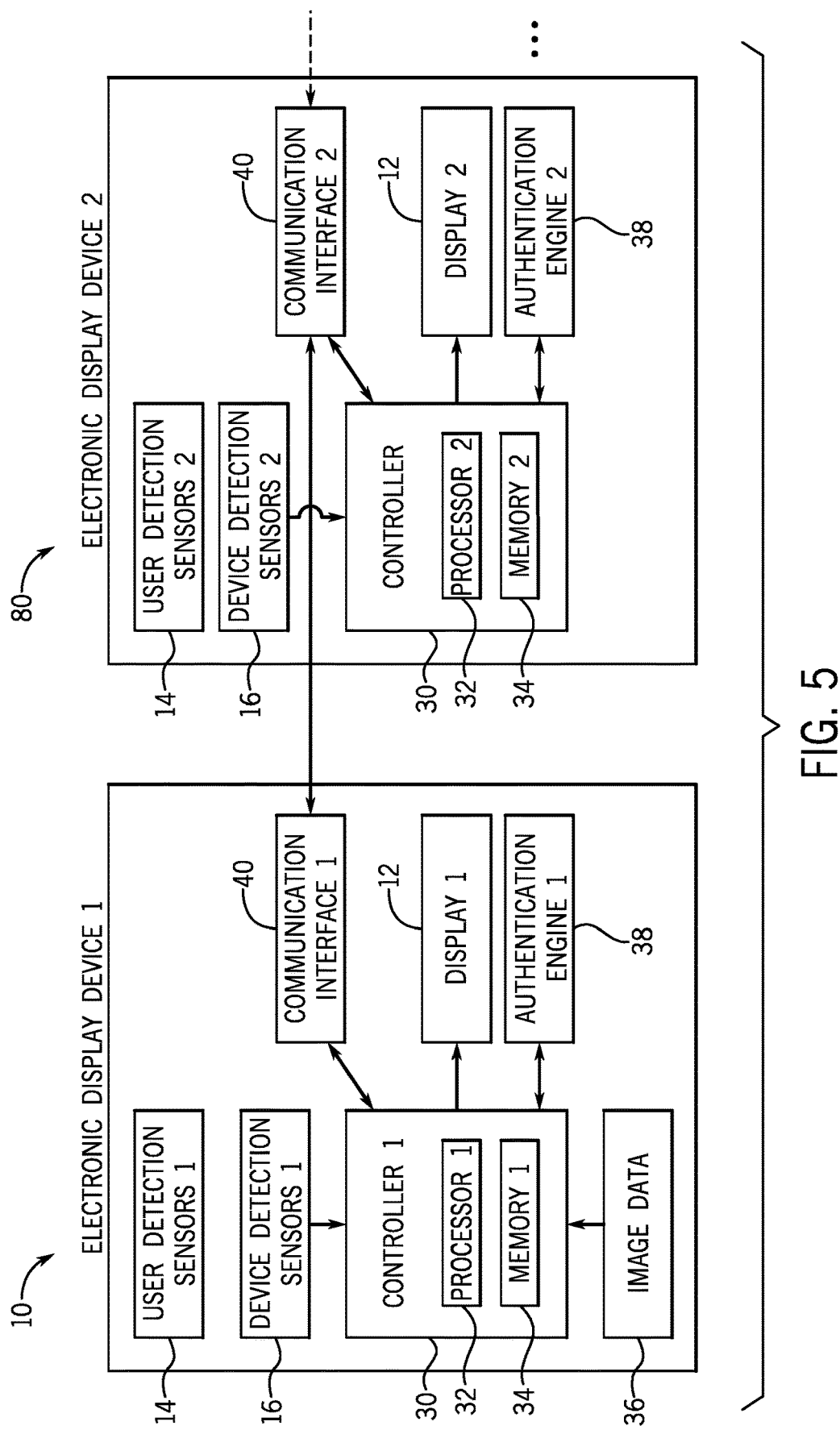
FIG. 5 is a block diagram of the electronic display device of FIG. 1 communicatively coupled to one or more other electronic display devices, according to embodiments of the present disclosure.

Additionally, when sharing the image data (e.g., 36) with another display device, the display device 10 may automatically reformat the image data 36 based on user location (e.g., of either or both users) without a user manually entering a desired format or orientation (e.g., portrait mode or landscape mode) on the display device 10. For example, FIG. 5 is a block diagram of the electronic display device 10 of FIG. 1 communicatively coupled to one or more other electronic display devices 80, according to embodiments of the present disclosure. Each of the display devices 10 and 80 may include the display 12, the one or more user detection sensors 14, the one or more device detection sensors 16, the controller 30 having the processor 32 and the memory device 34, the authentication engine 38, and the communication interface 40, as described with respect to FIG. 2. The display devices 10 and 80 may be communicatively coupled by their respective communication interfaces 40 (e.g., via a communication network). In particular, the display device 10 which receives the input image data 36 may send or share the image data 36 with the other display device 80. While FIG. 5 illustrates two display devices 10 and 80, it should be understood that more display devices may also be communicatively coupled to the display device 10 (via their respective communication interfaces 40).

Figure 6:
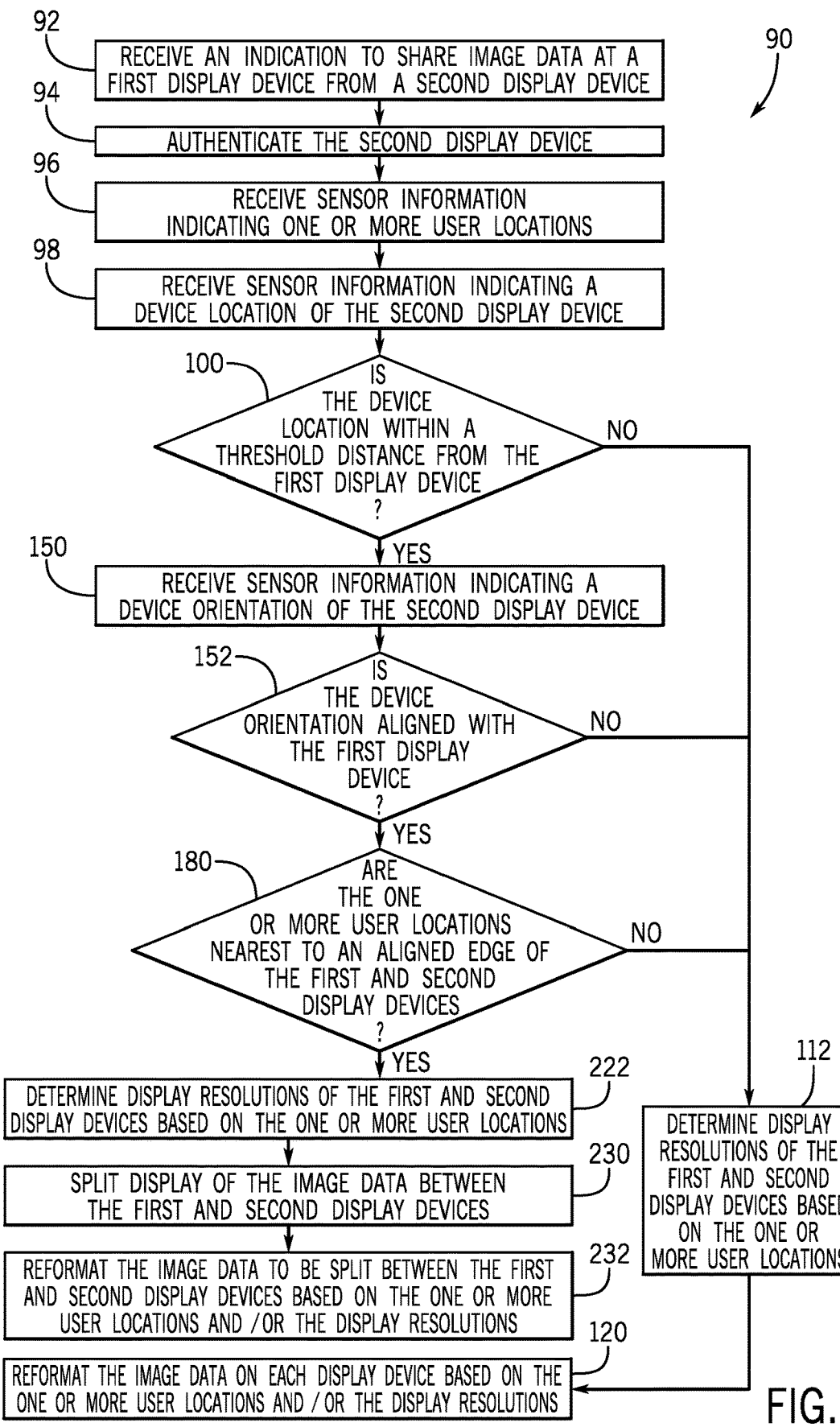
FIG. 6 is a flowchart illustrating a process for determining a user location using one or more user detection sensors of the communicatively coupled electronic display devices of FIG. 5 and reformatting image data based on the determined user location, according to an embodiment of the present disclosure.

FIG. 6 is a flowchart illustrating a process 90 for determining a user location using one or more user detection sensors 14 of the communicatively coupled display devices 10, 80 of FIG. 5 and reformatting image data based on the determined user location, according to an embodiment of the present disclosure. While the process 90 is described as being performed by the processor 32, it should be understood that the process 90 may be performed by any suitable device that may control components of the display devices 10, 80 of FIG. 5. Furthermore, while the process 90 is described using steps in a specific sequence, it should be understood that the present disclosure contemplates that the described steps may be performed in different sequences than the sequence illustrated, and certain described steps may be skipped or not performed altogether. In some embodiments, the process 90 may be implemented by executing instructions stored in a tangible, non-transitory, computer-readable medium, such as the memory devices 34 of the display devices 10, 80, using any suitable processing circuitry, such as the processors 32 of the display devices 10, 80.

As illustrated, in process block 92, the processor 32 receives an indication to share image data at a first display device (e.g., 80) from a second display device (e.g., 10). For example, the processor 32 of the second display device 10 may receive input image data 36 and send a request (via the communication interface 40) to the first display device 80 to share the image data 36. As such, the processor 32 of the second display device 80 may receive the request (via the communication interface 40) to share the image data 36 from the first display device 10. In some embodiments, the indication to share image data may result from the processor 32 automatically requesting to share the image data on the first display device 80 or a user manually selecting or confirming to share the image data on the first display device 80. In one embodiment, the processor 32 may enable voice as a location beacon for sharing. That is, the processor 32 may allow a user to share content using vocal natural language via voice location technology (e.g., as provided by a microphone and voice recognition or natural language software).

In process block 94, the processor 32 authenticates the second display device 10. In particular, the processor 32 of the first display device 80 may cause or instruct the authentication engine 38 to authenticate the second display device 10. For example, the authentication engine 38 of the first display device 80 may determine that the second display device 10 is a trusted device (e.g., is listed on a whitelist stored on the display device 80). If the second display device 10 is not a trusted device, then the authentication engine 38 may perform a process of determining (e.g., via the user) whether the second display device 10 should be a trusted device.

In process block 96, the processor 32 receives sensor information indicating one or more user locations in reference to either or both of the display devices 10, 80. In particular, the one or more user detection sensors 14 of either or both display devices 10, 80 may determine a user location based on sensing or detecting indications of a user, as described in process block 52 of FIG. 3.

In process block 98, the processor 32 receives sensor information indicating a device location of the second display device 10. In particular, the one or more device detection sensors 16 of the first display device 80 may determine the device location and of the second display device 10. For example, the device detection sensors 16 may include wearable or mobile device pairing sensors that may detect the second display device 10 and/or determine a distance to the other second display device 10. As another example, the device detection sensors 16 may include a Bluetooth sensor that determines a Bluetooth received signal strength indication (RSSI) of the second display device 10. The Bluetooth RSSI may be used to detect the second display device 10 within a Bluetooth signal range of the Bluetooth sensor and provide an approximate indication of distance of the second display device 10. In one embodiment, the device detection sensors 16 may include a 5G New Radio (NR) millimeter wave (mmWave) sensor that may detect directionality of the second display device 10 within a 5G NR mmWave range of the 5G NR mmWave sensor.

In some embodiments, the device detection sensors 16 may include one or more perimeter-based sensors that determine a proximity to the second display device 10 (e.g., that is adjacent or near-adjacent to the second display device 10). For example, the device detection sensors 16 may include a magnetic sensor, such as a Reed sensor, a Hall sensor, or a micro electro-mechanical system (MEMS) sensor, which measures a capacitance and/or a pressure of the second display device 10 to determine the proximity to the second display device 10. In some cases, the second display device 10 may include vibration emitters that may cause vibrations to be measured by the MEMS sensor of the first display device 80, providing an indication that the devices 10, 80 are adjacent or near adjacent. As another example, the device detection sensors 16 may include a camera or lower resolution light sensor (e.g., equipped with an ultra-wide-angle lens (e.g., a fisheye lens) or 180 degree lens) that may detect the second display device 10, which may be adjacent or near-adjacent to the first display device 10. In one embodiment, the device detection sensors 16 may include a camera (e.g., a panamorphic camera) that enables image capture of the second display device 10.

Figure 7:
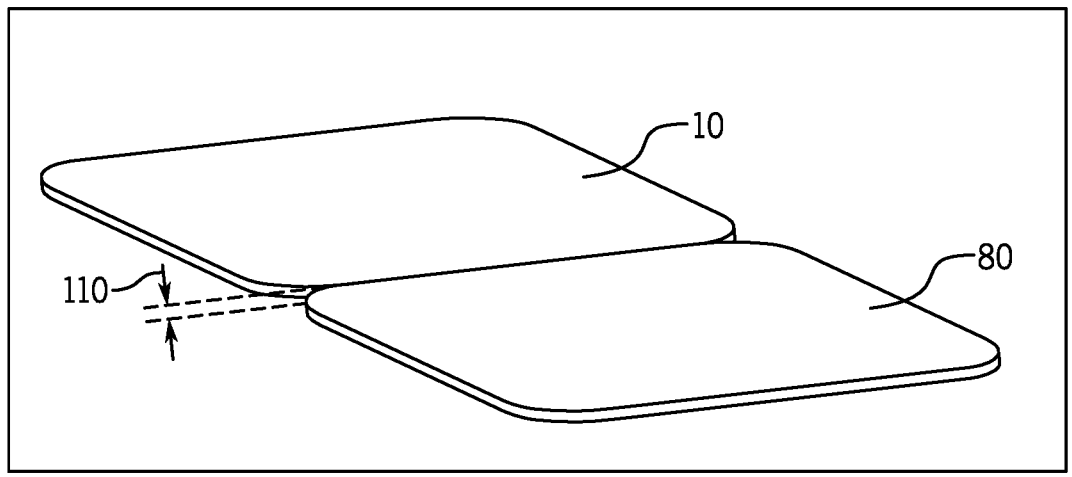
FIG. 7 is a perspective diagram of the electronic display devices of FIG. 5 within a threshold distance from one another, according to embodiments of the present disclosure.

In decision block 100, the processor 32 determines whether the device location of the second display device 10 is within a threshold distance from the first display device 80. The threshold distance may be any distance that is suitable for the display devices 80, 10 to combine to form a single, larger display. For example, FIG. 7 is a perspective diagram of the display devices 10, 80 within a threshold distance 110 from one another, according to embodiments of the present disclosure. As such, the threshold distance 110 may include a distance between the two display devices 80, 10 such that the display devices 80, 10 are in or near physical contact (e.g., approximately touching). For example, the threshold distance 110 may include a range of 0 to 2 centimeters, 0 to 1 centimeter, 0 to 3 millimeters, or the like.

Figure 8:
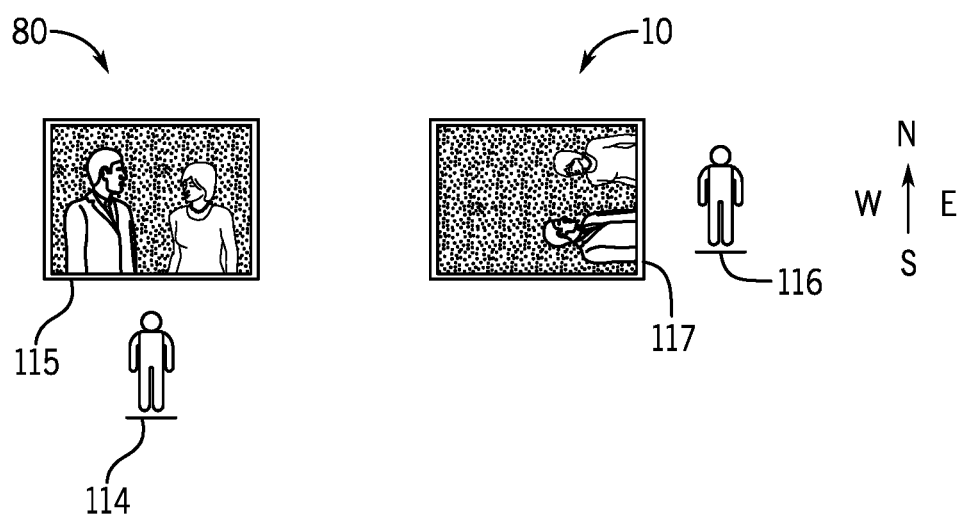
FIG. 8 is a perspective diagram of the display devices of FIG. 5 having different display formats or resolutions, according to embodiments of the present disclosure.

Turning back to FIG. 6, if the processor 32 determines that the device location of the second display device 10 is not within the threshold distance 110 from the first display device 80, then the processor 32, in process block 112, determines display formats or resolutions of the first and second display devices 80, 10 based on the one or more user locations. In particular, the processor 32 may determine the formats or resolutions of the displays 12 of the first and second display devices 80, 10 based on displaying or orienting image data toward the one or more user locations. For example, FIG. 8 is a perspective diagram of the display devices 10, 80 having different display formats or resolutions, according to embodiments of the present disclosure. Because a first user location 114 is nearest to the long edge 115 (e.g., illustrated as the southern edge 115) of the display device 80, the processor 32 may determine that the display format of the display device 80 is landscape orientation and toward the first user location 114 (as opposed to in portrait orientation or upside down). Because a second user location 116 is nearest the short edge 117 (e.g., illustrated as the eastern edge 117) of the display device 10, the processor 32 may determine that the display format of the display device 10 is portrait orientation toward the second user location 116 (as opposed to in landscape orientation or upside down).

Moreover, the processor 32 may determine display resolutions of the display devices, 80 10 based on the one or more user locations. For example, in FIG. 8, the illustrated display device 18 may have a display resolution (e.g., a native resolution) of 1920×1080 pixels when displaying or orienting image data toward the user location 114 nearest to the long edge 115 (e.g., illustrated as the southern edge 115) of the display device 80. However, if the user location was nearest to a short edge 118 (e.g., illustrated as the western edge 118) of the display device 80, then the display resolution would be 1080×1920 pixels. As such, the processor 32 may determine the display resolution of the display device 80 illustrated in FIG. 9 as 1920×1080 pixels or 1080×1920 pixels depending on the user location 114.

Figure 9:
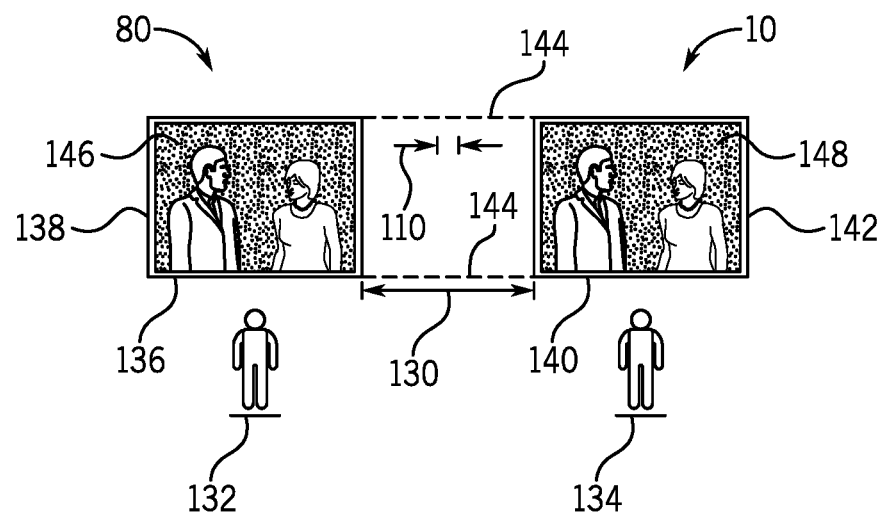
FIG. 9 is a perspective diagram of the display devices of FIG. 5 not within a threshold distance from one another, according to embodiments of the present disclosure.

In process block 120, the processor 32 reformats or orients image data based on the determined one or more user locations and/or the display resolutions of the display devices 80, 10. The processor 32 may then cause or instruct the displays 12 of the display devices 80, 10 to display the reformatted image data. In particular, the processor 32 of the second display device 10 may receive the input image data 36, and send the image data 36 to the first display device 80 via the respective communication interfaces 40. Each of the processors 32 of the display devices 10, 80 may then cause or instruct the respective displays 12 to display or the reformatted orient image data (e.g., 36) based on the user locations determined in process block 96. For example, FIG. 9 is a perspective diagram of the display devices 10, 80 not within a threshold distance 110 from one another, according to embodiments of the present disclosure. That is, the distance 130 between the display devices 10, 80 exceeds the threshold distance 110. As such, each of the processors 32 of the display devices 10, 80 may reformat or orient image data (e.g., 36) based on the user locations (e.g., 132, 134) determined in process block 96 and cause the display devices 10, 80 to display the reformatted image.

As illustrated, the processor 32 of the first display device 80 may determine that the user location 132 is nearest to a long edge 136 of the first display device 80. The processor 32 may then reformat image data 146 so that it is viewed right side up or as intended from the user location 132. In particular, the processor 32 may reformat the image data 146 such that it is displayed in landscape orientation toward the user location 132 (as opposed to in portrait orientation or upside down). If the user location 132 is nearest to a short edge 138 of the first display device 80, then the processor 32 may reformat the image data 146 such that it is displayed in portrait orientation toward the user location 132 (as opposed to in landscape orientation or upside down). Similarly, the processor 32 of the first display device 80 or the processor 32 of the second display device 10 may reformat image data 148 with respect to the user location 134 and a long edge 140 or short edge 142 of the second display device 10.

The processor 32 of the first display device 80 may also reformat the image data 146 by converting or resizing the image data 36 from an original or initial resolution to the resolution of the display device 80. For example, if the display device 80 has a resolution greater than that of the image data 146, the processor 32 of the display device 80 may scale up the image data 146 to match the resolution of the display device 80. If the display device 80 has a resolution less than that of the image data 146, the processor 32 the display device 80 may scale down the image data 146 to match the resolution of the display device 80.

Moreover, in some embodiments, the processor 32 of the display device 80 may determine the type of image data 146 (e.g., as part of a video or movie file, an image file, a text file, a presentation file, or a slideshow file). The processor 32 of the display device 80 may then convert the image data 146 from an original or initial format of the type of image data 146 to a more appropriate format based on the display format or resolution of the display device 80. For example, if the type of image data 146 is a video file, and the processor 32 of the display device 80 determines that the display device 80 is in landscape orientation (as illustrated in FIG. 9), then the processor 32 of the display device 80 may convert the image data 36 to a widescreen format. If the processor 32 of the display device 80 determines that the display device 80 is in portrait orientation, then the processor 32 of the display device 80 may convert the image data 146 to a standard or fullscreen format. Additionally or alternatively, the processor 32 of the display device 80 may apply video processing to the video file to scale up or scale down the video file based on the display resolution of the display device 80. That is, if the display device 80 has a resolution greater than that of the video file, the processor 32 of the display device 80 may apply video processing to scale up the image data 146 to match the resolution of the display device 80. If the display device 80 has a resolution less than that of the image data 146, the processor 32 may apply video processing to scale down the image data 146 to match the resolution of the display device 80.

Returning to FIG. 6, if the processor 32 determines that the device location of the second display device 10 is within the threshold distance 110 from the first display device 80, then the processor 32, in process block 150, receives sensor information indicating a device orientation of the second display device 10. In particular, the one or more device detection sensors 16 of the first display device 80 may determine the device orientation of the second display device 10. For example, the device detection sensors 16 may include a camera (e.g., a panamorphic camera) that enables image capture of the second display device 10. The device orientation of the second display device 10 may then be determined using image recognition techniques. In some cases, a device detection sensor 16 may detect the second display device 10 within a certain (e.g., threshold) proximity of the device detection sensor 16, and the first display device 80 may request that the second display device 10 send its orientation back to the first display device 80. The second display device 10 may determine its own orientation using orientation technology, which may include an accelerometer (e.g., a six-axis accelerometer), a gyroscope, and/or a magnetometer. Similarly, the first display device 80 may determine its own orientation to compare to that of the second display device 10 using its own orientation technology, which may include an accelerometer (e.g., a six-axis accelerometer), a gyroscope, and/or a magnetometer.

In decision block 152, the processor 32 determines whether the device orientation of the second display device 10 is approximately aligned with the first display device 80. The first and second devices 80, 10 may be approximately aligned when they are oriented in the same manner. For example, assuming the display devices 10, 80 are generally rectangular in shape, each having a pair of long edges and a pair of short edges, if the display devices 10, 80 are positioned horizontally (e.g., such that the pair of long edges are horizontal and the pair of short edges are vertical with respect to a user viewing the display devices 10, 80) and the respective pairs of long edges are approximately lined up, the display devices 10, 80 may be aligned (e.g., horizontally). Similarly, if the display devices 10, 80 are positioned vertically (e.g., such that the pair of short edges are horizontal and the pair of long edges are vertical with respect to a user viewing the display devices 10, 80) and the respective pairs of short edges are approximately lined up, the display devices 10, 80 may again be aligned (e.g., vertically).

Figure 10:
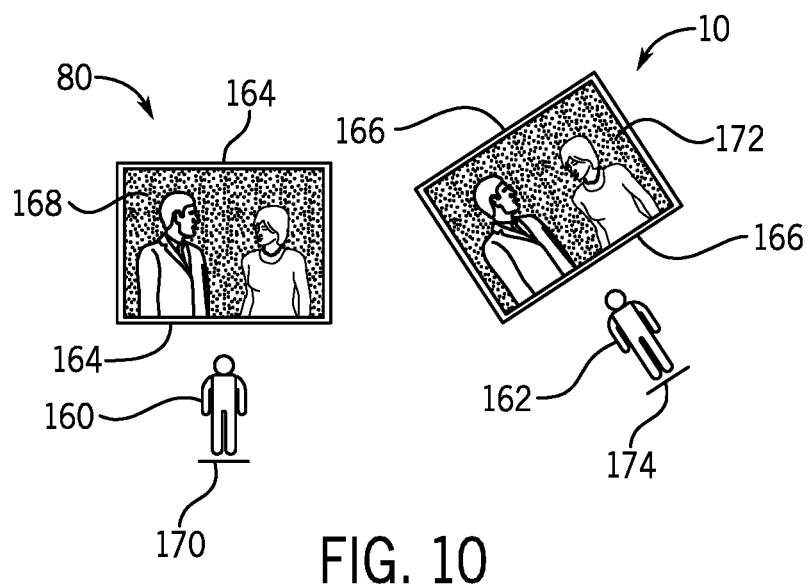
FIG. 10 is a perspective diagram of the display devices of FIG. 5 not aligned with one another, according to embodiments of the present disclosure.
Figure 11:
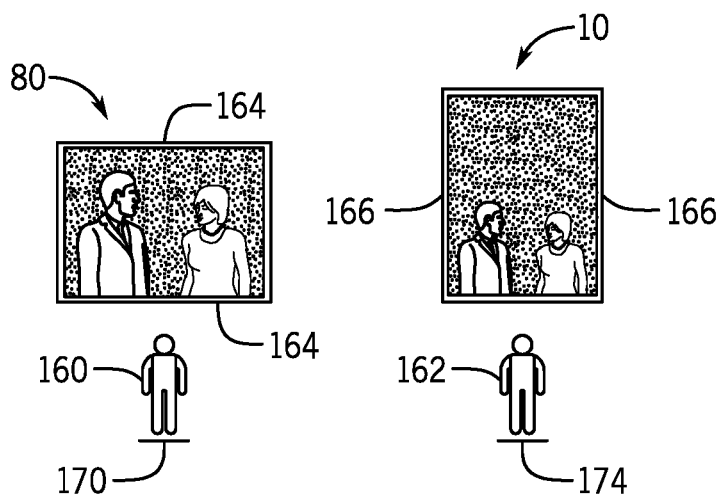
FIG. 11 is another perspective diagram of the display devices of FIG. 5 not aligned with one another, according to embodiments of the present disclosure.

For example, the display devices 10, 80 illustrated in FIG. 9 are approximately aligned, as they are both positioned horizontally and their respective pairs of long edges (e.g., 136, 140) are approximately lined up, as shown by dashed lines 144. As another example, FIG. 10 is a perspective diagram of the display devices 10, 80 not aligned with one another, according to embodiments of the present disclosure. Even though both display devices 10, 80 are positioned horizontally with the respective users 160, 162 viewing the display devices 10, 80, the respective pairs of long edges 164, 166 of the display devices 10, 80 do not line up. Similarly, FIG. 11 is another perspective diagram of the display devices 10, 80 not aligned with one another, according to embodiments of the present disclosure. In particular, the display device 10 is in landscape orientation, while the display device 80 is in portrait orientation. As such, even though the edges of both display devices 10, 80 are parallel to one another, the respective pairs of long edges 164, 166 of the display devices 10, 80 do not line up (and in fact are perpendicular to one another).

Turning back to FIG. 6, if the processor 32 determines that the device orientation of the second display device 10 is not approximately aligned with the first display device 80, then the processor 32, in process block 120, reformats or orients image data based on the determined one or more user locations and/or the display resolutions of the display devices 80, 10, as explained in detail above. The processor 32 may then cause or instruct the displays 12 of the display devices 80, 10 to display the reformatted image data. For example, the processor 32 of the first display device 80 may determine that the display devices 10, 80 illustrated in FIG. 10 are not approximately aligned. As such, each of the processors 32 of the display devices 10, 80 may reformat or orient image data (e.g., 36) based on the user locations (e.g., 132, 134) determined in process block 96 and cause the display devices 10, 80 to display the reformatted image. In particular, as shown in FIG. 10, the processor 32 of the first display device 80 reformats image data 168 such that the image data 168 is oriented in the direction of the first user location 170, and the processor 32 of the second display device 10 reformats image data 172 such that the image data 172 is oriented in the direction of the second user location 174.

If the processor 32 determines that the device orientation of the second display device 10 is approximately aligned with the first display device 80, then the processor 32, in decision block 180, determines whether the one or more user locations are nearest to an aligned edge of the first and second display devices 80, 10. In particular, the processor 32 may determine which edge a user location (e.g., a closest user location) is closest to. Similarly, the processor 32 may receive an indication from the processor 32 of the second display device 10 of which edge a user location (e.g., a closest user location) is closest to. For example, the processor 32 of the first display device 80 may cause or instruct the processor 32 of the second display device 10 to send the indication of which edge a user location is closest to. The processor 32 may determine if the two edges are an aligned edge of the display device 80, 10 (e.g., an edge formed by aligning a first edge of the first display device 80 and a second edge of the second display device 10).

Figure 12:
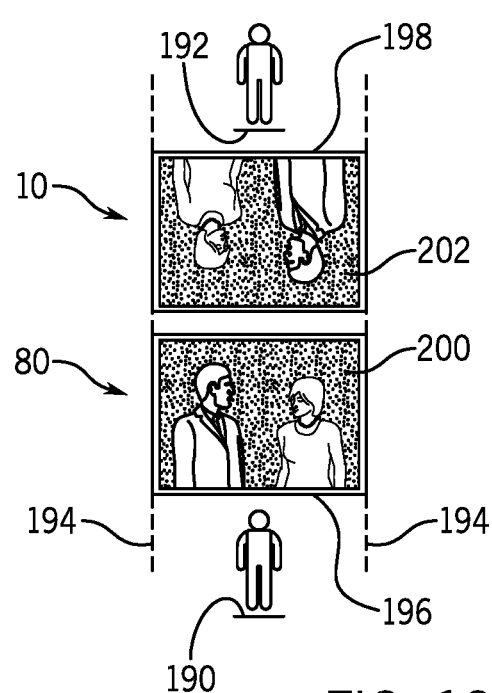
FIG. 12 is a perspective diagram of the display devices of FIG. 5 and user locations that are not nearest to an aligned edge of the display devices, according to embodiments of the present disclosure.
Figure 13:
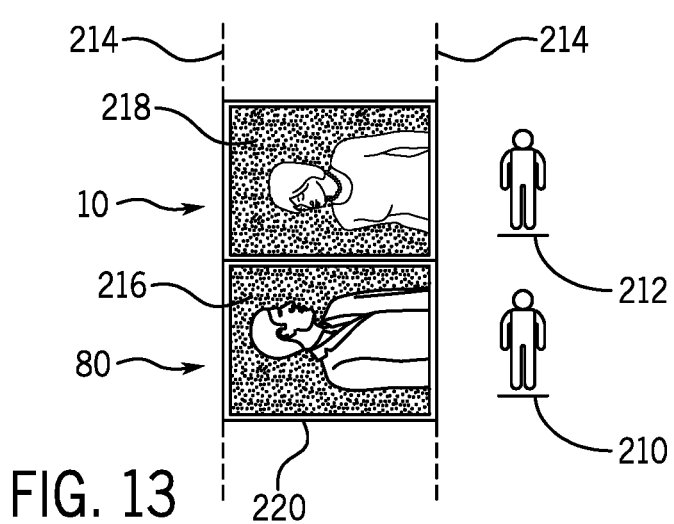
FIG. 13 is a perspective diagram of the display devices of FIG. 5 and user locations that are nearest to an aligned edge of the display devices, according to embodiments of the present disclosure.

For example, FIG. 12 is a perspective diagram of the display devices 80, 10 and user locations 190, 192 that are not nearest to an aligned edge 194 of the display devices 80, 10, according to embodiments of the present disclosure. In particular, a first user location 190 is nearest to an unaligned southern edge 196 of the first display device 80, while a second user location 192 is nearest to an unaligned northern edge 198 of the second display device 10. As another example, FIG. 13 is a perspective diagram of the display devices 80, 10 and user locations 210, 212 that are nearest to an aligned edge 214 of the display devices 80, 10, according to embodiments of the present disclosure. In particular, both of the user locations 210, 212 are nearest to the aligned eastern edge 214 of the display devices 80, 10. In some embodiments, the processor 32 may alternatively or additionally determine whether the one or more user locations are nearest to a single edge of either the first display device 80 or the second display devices 80, 10. For example, as illustrated, the processor 32 may determine whether the one or more user locations are nearest to a single edge 220 of the first display device 80.

Turning back to FIG. 6, if the processor 32 determines that the one or more user locations are not nearest to an aligned edge of the display devices 80, 10, then the processor 32, in process block 222, determines display formats or resolutions of the first and second display devices 80, 10 based on the one or more user locations (as described in detail with regards to process block 112).

In process block 120, the processor 32 reformats or orients image data based on the determined one or more user locations and/or the display resolutions of the display devices 80, 10, as explained in detail above. The processor 32 may then cause or instruct the displays 12 of the display devices 80, 10 to display the reformatted image data. For example, the processor 32 of the first display device 80 may determine that the user locations 190, 192 are not nearest to an aligned edge of the display devices 80, 10. As such, each of the processors 32 of the display devices 10, 80 may reformat or orient image data based on the user locations determined in process block 96 and cause the display devices 10, 80 to display the reformatted image. In particular, as shown in FIG. 12, the processor 32 of the first display device 80 reformats image data 200 such that the image data 200 is oriented in the direction of the first user location 190, and the processor 32 of the second display device 10 reformats image data 202 such that the image data 202 is oriented in the direction of the second user location 192.

Figure 16:
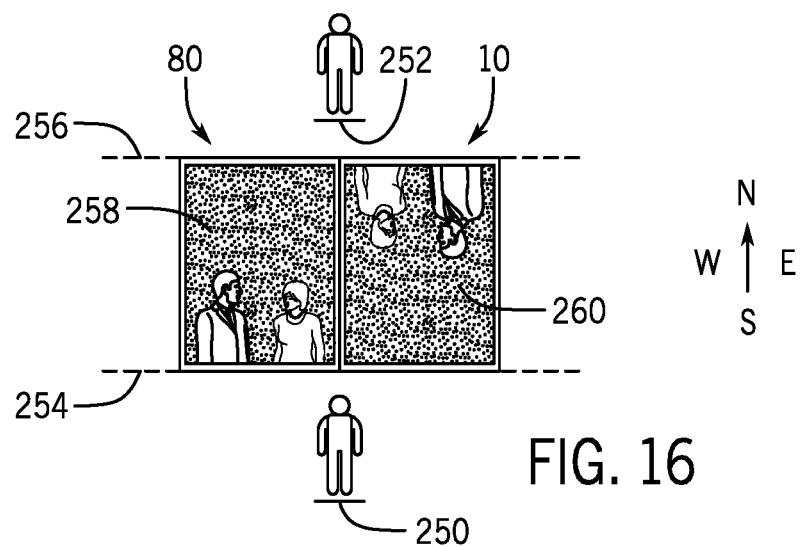
FIG. 16 is a perspective diagram of the display devices of FIG. 5 and user locations that are initially nearest to different aligned edges of the display devices, according to embodiments of the present disclosure.
Figure 17:
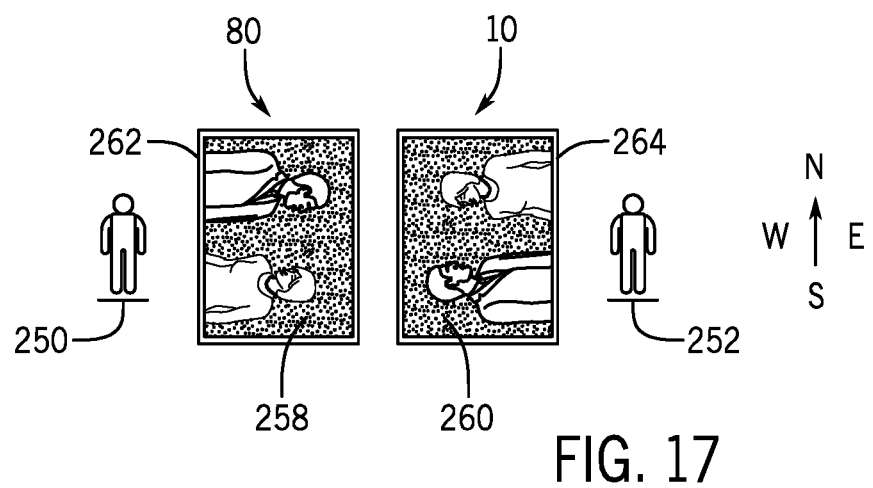
FIG. 17 is a perspective diagram of the display devices and user locations from FIG. 16 that have moved to different edges of the display devices, according to embodiments of the present disclosure.

As another example, FIG. 16 is a perspective diagram of the display devices 80, 10 and user locations 250, 252 that are initially nearest to different aligned edges 254, 256 of the display devices 80, 10, according to embodiments of the present disclosure. As illustrated, the display devices 80, 10 are both oriented vertically, or in a North/South orientation. A first user location 250 is nearest to a southern aligned edge 254, while a second user location 252 is nearest to a northern aligned edge 256. The processor 32 of either of the display devices 80, 10 may determine that the first user location 250 is closer to the first display device 80 while the second user location 252 is closer to the second display device 10. As such, the processor 32 reformats first image data 258 displayed on the first display device 80 in portrait mode and toward the first user location 250, such that the top of the first image data 258 corresponds to the northern direction. The processor 32 also reformats second image data 260 displayed on the second display device 10 in portrait mode and toward the second user location 252, such that the top of the second image data 260 corresponds to the southern direction. In some cases, the processor 32 may determine that one user location (e.g., 250) is closer to one display device (e.g., 80), while the other user location (e.g., 252) is approximately the same distance from both display devices 80, 10, and reformat the image data displayed on the display device 80 closer to the first user location 250 toward the first user location 250, while reformatting the image data displayed on the remaining display device 10 toward the remaining user location 252 (even though the second user location 252 is approximately the same distance from both display devices 80, 10). In one case, the processor 32 may determine that both user locations 250, 252 are approximately the same distance from both display devices 80, 10, and select by any suitable technique (e.g., based on sensing a user's gaze, eye direction, or head direction, detecting a wearable device on at a user location paired with one of the display devices, random selection, pseudo-random selection, or the like) which display device displays image data to which user location. FIG. 17 is a perspective diagram of the display devices 80, 10 and user locations 250, 252 from FIG. 16 that have moved to different edges 262, 264 of the display devices 80, 10, according to embodiments of the present disclosure. In particular, the first user location 250 moves from the southern aligned edge 254 in FIG. 16 to a western edge 262 in FIG. 17. The second user location 252 moves from the northern aligned edge 256 in FIG. 16 to an eastern edge 264 in FIG. 17. The processor 32 of either of the display devices 80, 10 may determine that the first user location 250 is closer to the first display device 80 while the second user location 252 is closer to the second display device 10. As such, the processor 32 reformats first image data 258 displayed on the first display device 80 in landscape mode and toward the first user location 250, such that the top of the first image data 258 corresponds to the eastern direction. The processor 32 also reformats second image data 260 displayed on the second display device 10 in landscape mode and toward the second user location 252, such that the top of the second image data 260 corresponds to the western direction.

Figure 18:
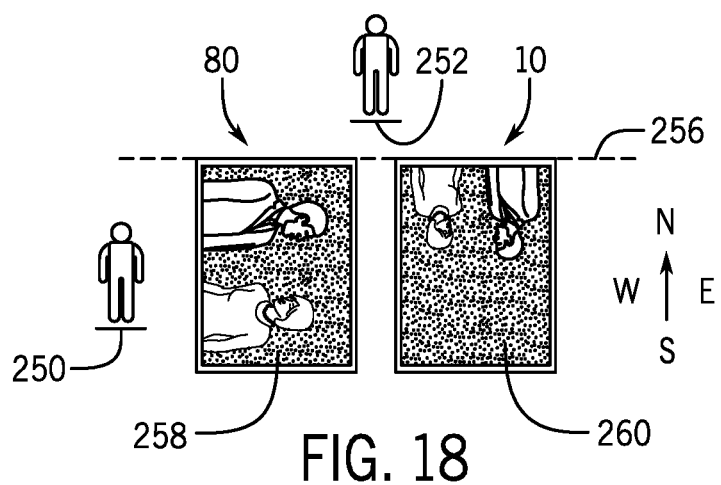
FIG. 18 is a perspective diagram of the display devices and user locations from FIG. 16 where a first user location has moved to a western edge of a first display device, according to embodiments of the present disclosure.

As yet another example, FIG. 18 is a perspective diagram of the display devices 80, 10 and user locations 250, 252 from FIG. 16 where the first user location 250 has moved to the western edge 262 of the first display device 80, according to embodiments of the present disclosure. In particular, the first user location 250 moves from the southern aligned edge 254 in FIG. 16 to a western edge 262 in FIG. 17, while the second user location 252 remains at the northern aligned edge 256. The processor 32 of either of the display devices 80, 10 may determine that the first user location 250 is closer to the first display device 80 while the second user location 252 is closer to the second display device 10. As such, the processor 32 reformats the first image data 258 displayed on the first display device 80 in landscape mode and toward the first user location 250, such that the top of the first image data 258 corresponds to the eastern direction. The processor 32 also reformats second image data 260 displayed on the second display device 10 in portrait mode and toward the second user location 252, such that the top of the second image data 260 corresponds to the southern direction.

In some cases, the processor 32 may determine that the second user location 252 is approximately the same distance from both display devices 80, 10, or even that the second user location 252 is closer to the first display device 80 than the second display device 10. However, because the first user location 250 is farther from the second display device 10 than the second user location 250, the processor 32 may reformat the image data 258 displayed on the display device 80 to orient display of the image data 258 toward the first user location 250, while reformatting the image data 260 displayed on the second display device 10 to orient display of the image data 260 toward the second user location 252.

If the processor 32 determines that the one or more user locations are nearest to an aligned edge of the display devices 80, 10, then the processor 32, in process block 230, splits display of the image data between the display devices 80, 10. In particular, the processor 32 of the first display device 80 may display a first portion 216 of the image data and the processor 32 of the second display device 10 may display a second portion 218 of the image data. Either or both of the processors 32 of the display devices 80, 10 may determine how to apportion or split the display of the image data into the first and second portions 216, 218.

In process block 232, the processor 32 then reformats or orients the image data to be split between the first and second display devices 80, 10 based on the determined one or more user locations and/or the display resolutions of the first and second display devices 80, 10. The processor 32 may then cause or instruct the display 12 of the first display device 80 and/or the display 12 of the second display device 10 to display respective split portions of the image data. In particular, each of the processors 32 of the display devices 10, 80 may receive the image data 36 to be split (or the image data already split), and reformat or orient the image data to be split based on the user locations determined in process block 96. For example, as illustrated in FIG. 13, the processor 32 of the first display device 80 may split the display of the image data into a left half and a right half, and display the left half of the image data (illustrated as the first portion 216) on the first display device 80 while the processor 32 of the second display device 10 displays the right half of the image data (illustrated as the second portion 218). The processor 32 may determine whether the image data 36 should be split into the left half and the right half based on the format and/or resolution of the image data 36 and/or the display devices 80, 10. The determination may be made based on whether splitting the image data 36 will warp the image data 36, distort the image data 36, or otherwise create a non-user-friendly experience. For example, if the image data 36 is part of a video or movie file, the processor 32 may determine not to split the image data 36 into the right half and the left half, as the border between the two display devices 80 may take away from the enjoyment of viewing the video or movie file.

In some embodiments, the processor 32 may determine that the one or more user locations are nearest to a single edge of either the first display device 80 or the second display devices 80, 10, and the processor 32 of the first display device 80 and/or the processor 32 of the second display device 10 may split the display of the image data into a top half and a bottom half. The processor 32 of the topmost display device may then display the top half of the image data while the processor 32 of the bottommost display device may display the bottom half of the image data. The processor 32 may determine whether the image data 36 should be split into the top half and the bottom half based on the format and/or resolution of the image data 36 and/or the display devices 80, 10. The determination may be made based on whether splitting the image data 36 will warp the image data 36, distort the image data 36, or otherwise create a non-user-friendly experience. For example, if the image data 36 is part of a video or movie file, the processor 32 may determine not to split the image data 36 into the top half and the bottom half, as the border between the two display devices 80 may take away from the enjoyment of viewing the video or movie file.

Figure 14:
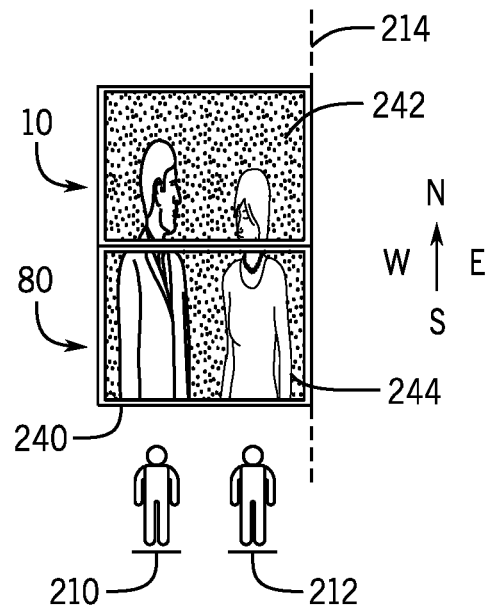
FIG. 14 is a perspective diagram of the display devices and user locations from FIG. 13 that have moved to a single southern edge of the display devices, according to embodiments of the present disclosure.

For example, FIG. 14 is a perspective diagram of the display devices 80, 10 and user locations 210, 212 from FIG. 13 that have moved to a single southern edge 240 of the display devices 80, 10, according to embodiments of the present disclosure. In particular, the first and second user locations 210, 212 move from the eastern aligned edge 214 in FIG. 13 to the southern edge 240 in FIG. 14. The processor 32 of either of the display devices 80, 10 may determine that the user locations 210, 212 are closest to the southern edge 240 of the first display device 80. As such, the processor 32 reformats the image data 36 to display the top half 242 of the image data 36 on the second display device 10 and the bottom half 244 on the first display device 80. In some embodiments, the processor 32 may first determine whether the image data 36 should be split into the top half 242 and the bottom half 244 based on the format and/or resolution of the image data 36 and/or the display devices 80, 10.

Figure 15:
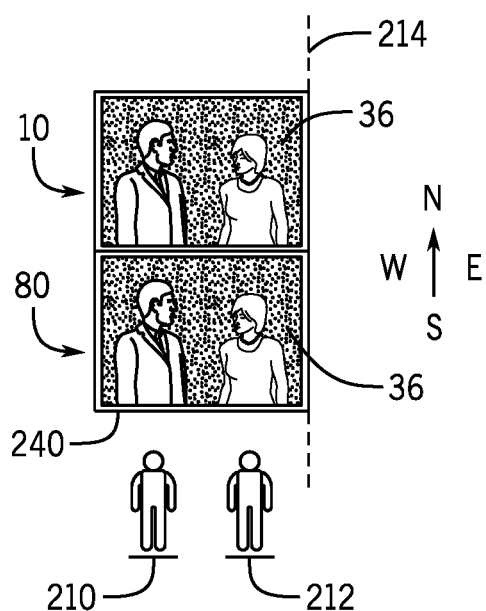
FIG. 15 is a perspective diagram of the display devices and user locations from FIG. 13 that have moved to the single southern edge of the display devices, where a processor has determined not to split image data, according to embodiments of the present disclosure.

If the processor 32 determines that the image data 36 should not be split into the top half 242 and the bottom half 244, then the processor 32 may reformat the image data 36 to be displayed on each of the first and second display devices 80, 10. For example, FIG. 15 is a perspective diagram of the display devices 80, 10 and user locations 210, 212 from FIG. 13 that have moved to the single southern edge 240 of the display devices 80, 10, where the processor 32 has determined not to split the image data 36, according to embodiments of the present disclosure. As such, the processor 32 reformats the image data 36 to display the image data 36 on each of the first display device 80 and the second display device 10.

Similarly, each or both of the processors 32 of the display devices 10, 80 may automatically determine that the display devices 10, 80 are no longer within the threshold distance 110 (e.g., because of the users moves the display devices 10, 80 away from each other exceeding the threshold distance 110), and, in response, each reformat or re-orient the image data (instead of splitting the image data) and cause the display devices 10, 80 to display each reformatted image, as described in process block 120.

In one embodiment, the processor 32 may determine whether the content or type of image data 36 that is to be displayed, and may determine whether to split the image data 36 between the display devices 10, 80 based on the content or type of image data 36. For example, some content or types of image data 36 may be more appropriate to split between the display devices 10, 80, such as images, videos, and/or presentations. However, other content or types of image data 36 may be more appropriate to not split or apportion between the display devices 10, 80, such as document data. Moreover, in some embodiments, users may configure settings to share or prevent sharing of selected content or types of image data 36.

Moreover, while the process 90 describes using device location, device orientation, and user locations to determine whether display of image data 36 should be split between the display devices 10, 80, it should be understood that any suitable factors or parameters may be used to determine whether display of image data 36 should be split. For example, the processor 32 may take into account differences in size, aspect ratio, resolution, quality, or any other factor of the respective displays 12 of the display devices 10, 80 in determining whether display of image data 36 should be split. As another example, the processor 32 may determine multiple user locations around the display devices 80, 10. As such, the processor 32 may use any suitable criteria regarding the multiple user locations when determining whether display of image data 36 should be split. For example, if there is a majority of user locations along a single edge of either of the display devices 80, 10 or an aligned edge of the display devices 80, 10, then the processor 32 may split display of the image between the display devices 80, 10 and reformat or orient the image data 36 toward that single edge or aligned edge. If the multiple user locations are approximately evenly spread out along at least two of the single edges of either of the display devices 80, 10 and the aligned edges of the display devices 80, 10, then each processor 32 of the display devices 80, 10 may display the image data 36 on their respective displays 12 (and reformat or orient the image data 36 toward the nearest user location).

In this manner, the process 90 may determine a user location using one or more user detection sensors 14 of communicatively coupled display devices 10, 80 and reformat image data based on the determined user location. Moreover, the display devices 10, 80 may automatically reformat the image data based on user location (e.g., of either or both users) without a user manually entering a desired format or orientation (e.g., portrait mode or landscape mode) on a display device 10, 80. In addition, the display devices 10, 80 may automatically determine whether they are touching or almost touching (e.g., within a threshold distance) and, in response, split, reformat, or re-orient the image data to combine to form a single, larger display. Similarly, the display devices 10, 80 may automatically determine that they are no longer touching or almost touching and, in response, each reformat or re-orient the image data (instead of splitting the image data), and display the reformatted image data. By automatically reformatting image data toward one or more users using device sensors, instead of relying on manual display customization from the users, the presently disclosed techniques provide more efficient and intuitive user experiences.

In addition, the display devices may automatically determine whether they are touching or almost touching and, in response, split, reformat, or re-orient the image data to combine to form a single, larger display. Similarly, the display devices may determine that they are no longer touching or almost touching and, in response, reformat or re-orient the image data (instead of splitting the image data), and display the reformatted image data.

While the embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic display device for reformatting image data based on user locations using device sensing, comprising:
   a display configured to display image data;
   a first set of user detection sensors configured to detect the user locations in reference to the electronic display device; and
   a controller communicatively coupled to the first set of user detection sensors, wherein the controller comprises a processor, wherein the processor is configured to:
      receive the image data;
      receive the user locations from the first set of user detection sensors, a second set of user detection sensors of an additional electronic display device, or both;
      sent at least a portion of the image data to the additional electronic display device;
      cause the display to apportion display of the image data between the electronic display device and the additional electronic display device in response to determining that the user locations are located at aligned edges of the electronic display device and the additional electronic display device; and
      cause the display to orient the image data of the electronic display device to a first user location of the user locations at a first edge of the electronic display device, and cause the display to orient the image data of the additional electronic display to a second user location of the user locations at a second edge of the additional electronic display device, in response to determining that the user locations are not located at the aligned edges of the electronic display device and the additional electronic display device.

2. The electronic display device of claim 1, wherein the first set of user detection sensors, the second set of user detection sensors of the additional electronic display device, or both, are configured to determine a distance to the additional electronic display device, an orientation of the additional electronic display device, or both.

3. The electronic display device of claim 2, wherein the first set of user detection sensors, the second set of user detection sensors of the additional electronic display device, or both, comprise a wearable device pairing sensor, a mobile device pairing sensor, a Bluetooth sensor, a 5G New Radio (NR) millimeter wave (mmWave) sensor, a magnetic sensor, such as a Reed sensor, a Hall sensor, a micro electromechanical system (MEMS) sensor, a camera, a lower resolution light sensor, or any combination thereof.

4. The electronic display device of claim 2, comprising an authentication engine configured to authenticate the additional electronic display device.

5. The electronic display device of claim 1, wherein the aligned edges of the electronic display device and the additional electronic display device comprise a third edge of the electronic display device and a fourth edge of the additional electronic display device.

6. A non-transitory, computer readable medium comprising instructions, wherein the instructions are configured to be executed by a processor to perform operations for reformatting image data using device sensing comprising:
  receiving image data;
  receiving sensor information indicating user locations in reference to a first electronic display device comprising the processor from one or more user detection sensors of the first electronic display device;
  in response to determining that the user locations are at aligned edges of the first electronic display device and a second electronic display device, apportioning display of the image data between the first electronic display device and the second electronic display device; and
  in response to determining that the user locations are not located at the aligned edges of the first electronic display device and the second electronic display device:
    orienting the image data of the first electronic display device to a first user location of the user locations at a first unaligned edge of the first electronic display device; and
    orienting the image data of the second electronic display to a second user location of the user locations at a second unaligned edge of the second electronic display device.

7. The non-transitory, computer readable medium of claim 6, wherein the instructions are configured to be executed by the processor to perform operations comprising determining that a device location of the second electronic display device is within a threshold distance of the first electronic display device.

8. The non-transitory, computer readable medium of claim 7, wherein the instructions are configured to be executed by the processor to perform operations comprising apportioning display of the image data between the first electronic display device and the second electronic display device in response to determining that the device location of the second electronic display device is within the threshold distance of the first electronic display device.

9. The non-transitory, computer readable medium of claim 7, wherein the instructions are configured to be executed by the processor to perform operations comprising orienting the image data of the first electronic display device toward the first user location and orienting the image data of the second electronic display device toward the second user location occurs in response to determining that the device location of the second electronic display device is not within the threshold distance of the first electronic display device.

10. The non-transitory, computer readable medium of claim 7, wherein the device location of the second electronic display device is determined based on sensor information received from one or more device detection sensors of the first electronic display device.

11. The non-transitory, computer readable medium of claim 7, wherein the device location of the second electronic display device is received from the second electronic display device.

12. The non-transitory, computer readable medium of claim 6, wherein the aligned edges of the first electronic display device and the second electronic display device comprise a first edge of the first electronic display device and a second edge of the second electronic display device, wherein the instructions are configured to be executed by the processor to perform operations comprising determining that the first edge of the first electronic display device and the second edge of the second electronic display device are aligned.

13. A method for reformatting image data using device sensing, comprising:
  receiving, via a processor of a first electronic display device, image data;
  receiving, via the processor, sensor information indicating a plurality of user locations in reference to the first electronic display device from one or more user detection sensors; and
  causing, via the processor, a display to reformat the image data based on the plurality of user locations, wherein reformatting the image data comprises:
    in response to determining that the plurality of user locations is nearest to an aligned edge of the first electronic display device and a second electronic display device, apportioning, via the processor, display of the image data between the first electronic display device and the second electronic display device; and
    in response to determining that a first user location of the plurality of user locations is nearest to a first edge of the first electronic display device, the second electronic display device, or both, and that a second user location of the plurality of user locations is nearest to a second edge of the first electronic display device, the second electronic display device, or both, wherein the first edge is different from the second edge, reformatting, via the processor, the image data to display the image data on the first electronic display device toward the first user location and to display the image data on the second electronic display device toward the second user location.

14. The method of claim 13, comprising authenticating, via the processor, the first electronic display device.

15. The method of claim 13, wherein apportioning display of the image data between the first electronic display device and the second electronic display device occurs in response to determining that the first electronic display device and the second electronic display device are both displaying the image data in portrait mode or both displaying the image data in landscape mode.

16. The method of claim 13, wherein the aligned edge comprises an edge formed by aligning a third edge of the first electronic display device and a fourth edge of the second electronic display device.

17. The method of claim 13, wherein the first edge comprises the aligned edge of the first electronic display device and the second electronic display device.

18. The method of claim 17, wherein the second edge comprises a second aligned edge of the first electronic display device and the second electronic display device.

19. The method of claim 17, wherein the second edge comprises an unaligned edge of the first electronic display device or the second electronic display device.

20. The method of claim 17, wherein the first edge comprises a first unaligned edge of the first electronic display device, and the second edge comprises a second unaligned edge of the second electronic display device.

* * * * *